United States Patent [19]
Alrutz et al.

[11] Patent Number: 4,787,697
[45] Date of Patent: Nov. 29, 1988

[54] OPTICAL FIBER CONNECTOR HAVING MAGNIFYING LENS

[75] Inventors: Mark E. Alrutz; David L. Dean; Dennis M. Knecht, all of Hickory, N.C.

[73] Assignee: Siecor Corporation, Hickory, N.C.

[21] Appl. No.: 123,239

[22] Filed: Nov. 20, 1987

[51] Int. Cl.[4] .......................... G02B 6/36; G02B 7/26
[52] U.S. Cl. .............................. 350/96.20; 350/96.18; 350/96.21
[58] Field of Search ............... 350/96.18, 96.20, 96.21, 350/96.22

[56] References Cited

U.S. PATENT DOCUMENTS

| | | | |
|---|---|---|---|
| 4,192,575 | 3/1980 | Hodge | 350/96.21 |
| 4,201,443 | 5/1980 | Hodge | 350/96.20 |
| 4,439,005 | 3/1984 | Winzer | 350/96.20 |
| 4,563,057 | 1/1986 | Ludman | 350/96.18 |
| 4,565,593 | 1/1986 | Marr | 350/96.21 |

Primary Examiner—William L. Sikes
Assistant Examiner—Robert E. Wise
Attorney, Agent, or Firm—J. David Abernethy

[57] ABSTRACT

An optical fiber connector having a magnifying lens to aid the user in placement of the optical fibers to be abutted.

8 Claims, 2 Drawing Sheets

OPTICAL FIBER CONNECTOR HAVING MAGNIFYING LENS

BACKGROUND OF THE INVENTION

1. Field of the Invention

The invention pertains to connectors for optical fibers.

2. Background of the Invention

With the increasing use of optical fibers in the telecommunications industry, the need exists for ways to transfer optical pulses from one optical fiber to another without undue power loss, which is often referred to as attenuation. Some connectors require optical fibers to be placed end to end, so that light may exit one fiber directly into another. Many fiber optic connectors contemplate that the craftsperson performing the connection will abut the fibers using hand-eye coordination. The optical fibers are rather small; they can be seen with the naked eye, but the process requires a high degree of concentration by the craftsperson. Power loss results if the fiber ends are too far apart, since an undue amount of light will escape. However, if the fibers are pressed together with too much force, one or both fiber tips may break, which naturally is also undesirable. Ideally, the fiber ends should be placed adjacent to each other without either the fiber ends being highly compressed or with space remaining between them.

To aid the craftsperson in this task, some connectors use a feedback process using power transmission. The craftsperson adjusts the fiber ends while watching a meter indicating the amount of power transmitted from one fiber to the other. The splice is completed when the craftsperson feels that the minimum power loss has been achieved.

BRIEF SUMMARY OF THE INVENTION

Since the small glass fiber ends may be difficult to see, particularly in a connector, the invention calls for a magnifying lens which allows the viewer to see a magnified view of the area of fiber optic connector having an abutment of the optical fibers. Since the craftsperson now can easily see the location of the fiber ends, the task of placing the fiber ends in proper position is made much less difficult. Use of such a magnification lens will increase the probability of obtaining optical connections with low power loss and will also reduce the number of chipped or broken optical fibers which are the casualty of previous methods.

The preferred embodiment of the invention uses an inner transparent frame and an outer transparent sleeve disposed around the frame. In one form, the inner transparent frame includes the magnifying lens. In another form, the magnifying lens is a part of the outer transparent sleeve. If the frame form is chosen, it is preferred to place the optical fibers within a channel contained in a frame, and providing a lid for the frame. In this version, the frame lid comprises the magnifying lens, which may be a spherical or a cylindrical plano-convex lens; since the magnifying lens must enable the viewer to see the abutting fiber ends through the lens, the lens should be transverse to the area of abutment of the optical fibers.

BRIEF DESCRIPTION OF THE DRAWINGS

Reference is now had to the drawings, in which.

DETAILED DESCRIPTION OF THE PREFERRED EMBODIMENTS

Figure 1:
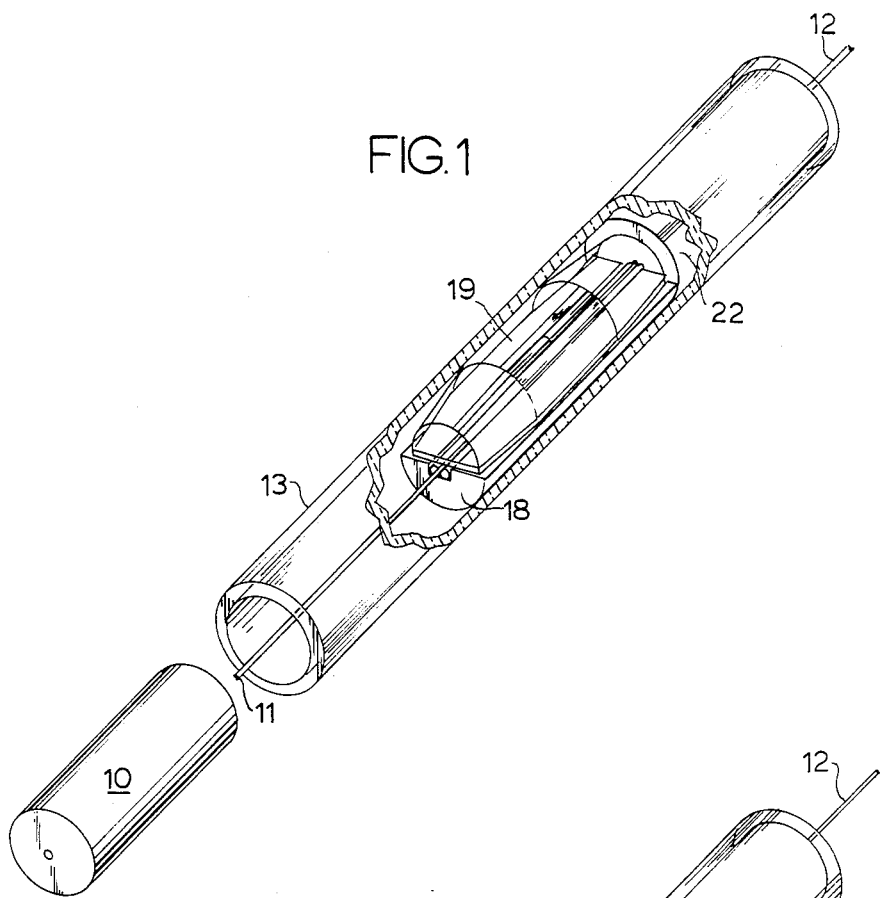
FIG. 1 is a cut-away perspective view of the first embodiment of the invention.

Reference is now had to FIG. 1, in which optical fibers 11 and 12 are to be connected. A transparent sleeve, tube 13, is disposed around ferrules 10, 22, frame 18, and frame lid 19. Optical fibers 11, 12 enter the connector through ferrules 10, 22, respectively. Ferrules 10, 22 may be transparent or opaque as desired. After passing through ferrules 10, 22, the optical fiber ends enter a channel in frame 18; in the preferred embodiment, the fibers lie in a groove formed by two rods lying in the channel. Frame lid 19 rests on frame 18. Frame lid 19 contains a cylindrical plano-convex lens transverse to the area of abutment of optical fibers 11, 12, as shown. The magnification provided by the lens allows the user to place optical fibers 11, 12 in an end-to-end abutting relationship with a better view of the fiber ends.

Figure 2:
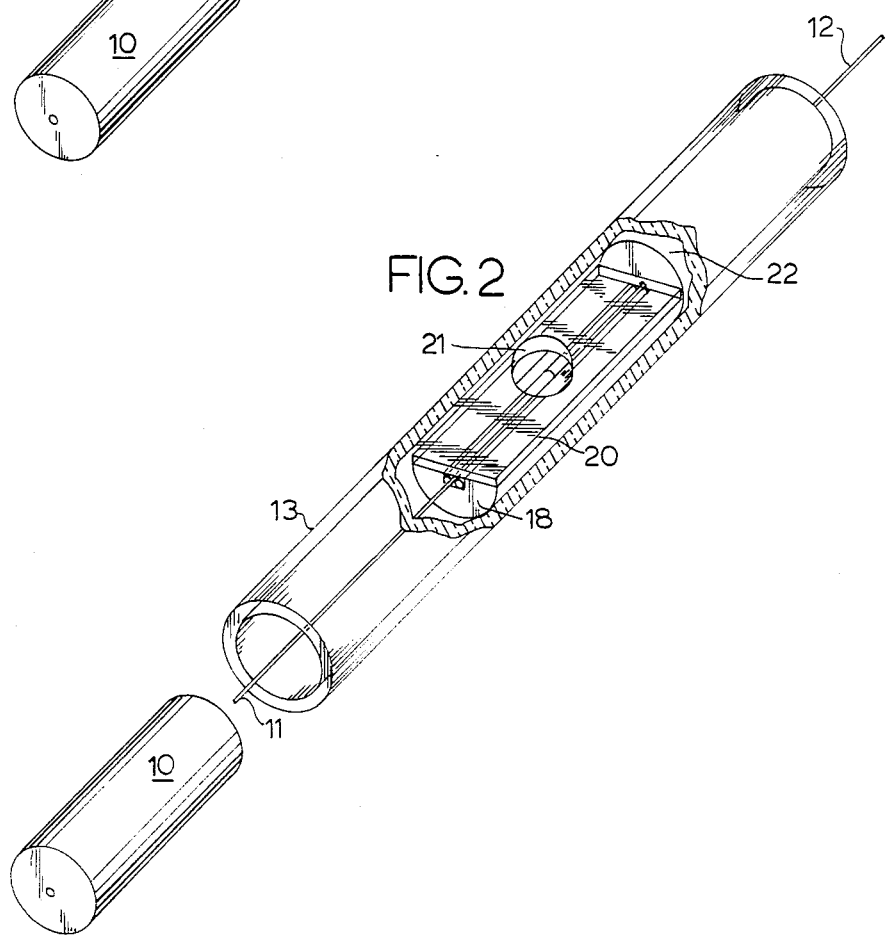
FIG. 2 is a cut-away perspective view of the second embodiment of the invention; and, FIG. 3 is a perspective view of the third embodiment of the invention.

FIG. 2 discloses the second embodiment of the invention, which in most respects is the same as the first embodiment shown in FIG. 1. However, frame lid 20 now comprises spherical plano-convex lens 21 which is placed in a central position transverse to the area of abutment of optical fibers 11, 12. Ferrule 10 is shown removed from the sleeve in FIGS. 1 and 2 for better comprehension.

Figure 3:
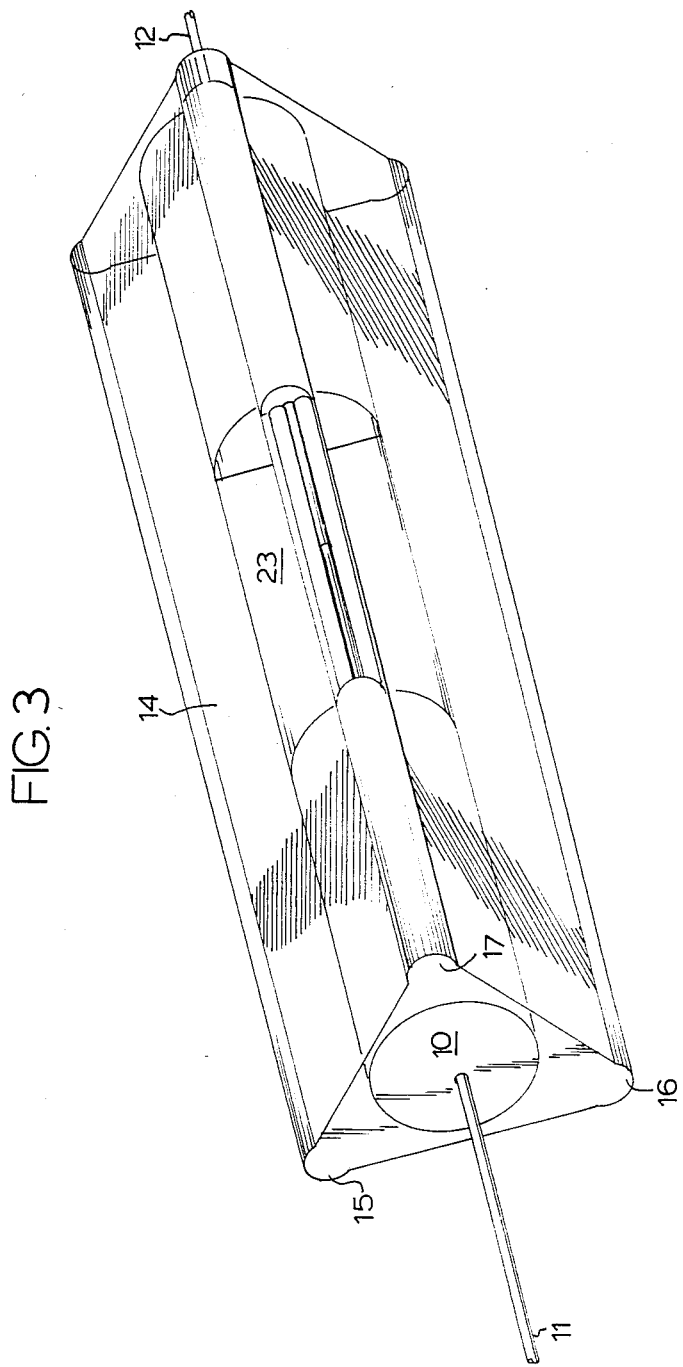

FIG. 3 shows the third embodiment of the invention. Transparent frame 23 holds optical fibers 11 and 12 in an end-to-end abutting relationship. In this instance, however, it is the outer transparent sleeve 14 which performs the magnification function. Outer transparent sleeve 14 is triangular in cross section and contains magnifying portions 15, 16, 17 at its vertices. Magnifying portions 15, 16, 17 magnify the area of abutment of the optical fibers in similar fashion to a common thermometer.

Other specific lenses could be included as a part of the frame or sleeve, and the number of magnifying lenses in the frame or sleeve may vary without departing from the scope of the invention. In each case, the curvature of a lens is determined by the material used to manufacture it. Given a material of known refractive index, the curvature can be simply calculated to put the focal point of the system at the area of abutment of the optical fibers, for maximum magnification. For instance, in FIG. 1, a polycarbonate top section 1.4 millimeters thick may be used, which has a refractive index of 1.586. If the focal length is 1.5 millimeters, the lens curvature will be 1.138 1/mm.

In the first two embodiments, the preferred embodiment would include a resilient coating on the rods resting in the channel in order to urge each of the optical fiber free ends into proper alignment when frame lid 19 or 20 is placed on frame 18. This arrangement may also be used in the third embodiment. Again, any of a wide number of known mechanical splices, incorporating various centering methods, can be incorporated without departing from the spirit and scope of the invention.

What is claimed is:

1. Apparatus comprising:
   (a) two optical fibers; and
   (b) a frame holding the two optical fibers in an end to end abutting relationship, the frame having a transparent portion comprising a magnifying lens transverse to the area of abutment of the optical fibers.

2. Apparatus comprising:
   (a) two optical fibers;
   (b) a frame holding the two optical fibers in an end to end abutting relationship, the frame having a transparent portion transverse to the area of abutment of the optical fibers; and
   (c) an outer sleeve comprising a magnifying lens disposed around the frame.

3. Apparatus as recited in claim 2, the outer sleeve comprising a magnifying lens transverse to the area of abutment of the optical fibers.

4. Apparatus as recited in claim 2, the outer sleeve comprising two magnifying lenses transverse to the area of abutment of the optical fibers.

5. Apparatus as recited in claim 2, the outer sleeve comprising three magnifying lenses transverse to the area of abutment of the optical fibers.

6. Apparatus comprising:
   (a) a frame having a channel therein;
   (b) two optical fiber ends placed in an end to end abutting relationship in the channel;
   (c) a frame lid comprising a magnifying lens; and
   (d) a sleeve placed around the frame and frame lid, the sleeve being transparent adjacent to the magnifying lens.

7. Apparatus as recited in claim 6, wherein the magnifying lens is spherical plano-convex.

8. Apparatus as recited in claim 6, wherein the magnifying lens is cylindrical plano-convex.

* * * * *